Nov. 25, 1969  J. A. HERON  3,480,071
METHOD OF SHELL MOULDING AND CASTING
Filed Sept. 14, 1967  2 Sheets-Sheet 1

Inventor
JOHN AHERNE HERON

By Cushman, Darby & Cushman
Attorneys

Nov. 25, 1969     J. A. HERON     3,480,071
METHOD OF SHELL MOULDING AND CASTING
Filed Sept. 14, 1967     2 Sheets-Sheet 2

Inventor
JOHN AHERNE HERON
By
Cushman, Darby & Cushman
Attorneys

United States Patent Office 3,480,071
Patented Nov. 25, 1969

3,480,071
METHOD OF SHELL MOULDING AND CASTING
John Aherne Heron, Farnham Royal Lodge,
Buckinghamshire, England
Filed Sept. 14, 1967, Ser. No. 667,688
Int. Cl. B22d 47/02, 7/02
U.S. Cl. 164—36
6 Claims

ABSTRACT OF THE DISCLOSURE

A method of simultaneously forming a whole group of cast objects includes the formation of an assembly made up of expendable patterns of the group of objects and of an apertured trough member, covering the assembly with shell mould material, and removing the expendable material.

---

This invention concerns improvements relating to shell moulding.

According to one aspect of the present invention, there is provided a refractory ceramic trough member adapted for use in shell moulding and having a plurality of apertures in the base thereof each of which communicates with the trough in the trough member.

The aperture and/or the trough are preferably funnel-shaped.

There are preferably a row of similar apertures in the said base.

The invention also comprises a method of forming cast objects comprising the steps of making expendable patterns of the said objects; forming an assembly of a plurality of the expendable patterns and of a common trough member as set forth above, the said assembly being formed by introducing a part of each expendable pattern, or a support member carrying the expendable pattern, into an aperture in the trough member; applying shell mould material to cover each of the expendable patterns of said assembly, and to cover at least the adjacent external surface of the trough member, so as to form a plurality of interconnected shell moulds, all of which are secured to the trough member; removing the expendable material (and, if necessary, the support members) from the assembly to which the shell mould material has been applied and simultaneously or subsequently firing the trough member and shell moulds; pouring molten metal into the trough in the trough member so as to fill the shell moulds therewith; allowing the metal to set to produce the cast objects; and effecting relative separation of the shell moulds and trough member from the cast objects.

Each support member may be of non-expendable material but is coated with expendable material.

As will be appreciated, this method permits a batch of cast objects to be very swiftly and readily made.

The expendable material may be removed by inverting the assembly to which the shell mould material has been applied so that the shell moulds are uppermost, and introducing the inverted assembly into a furnace which melts out the expendable material and fires the trough member and empty shell moulds.

Alternatively, the expendable material may be removed by placing the assembly in hot water, and subsequently firing the trough member and empty shell moulds.

The said assembly may be periodically moved between at least one dipping station, where it is covered with a refractory slip, and at least one dusting station where it is then dusted with refractory material. Thus, the assembly may be mounted on a pivoted arm which is moved alternately between the dipping and dusting stations.

The assembly is preferably automatically conveyed from one step to the next.

The invention also comprises a cast object when made by the method set forth above.

Figure 1:
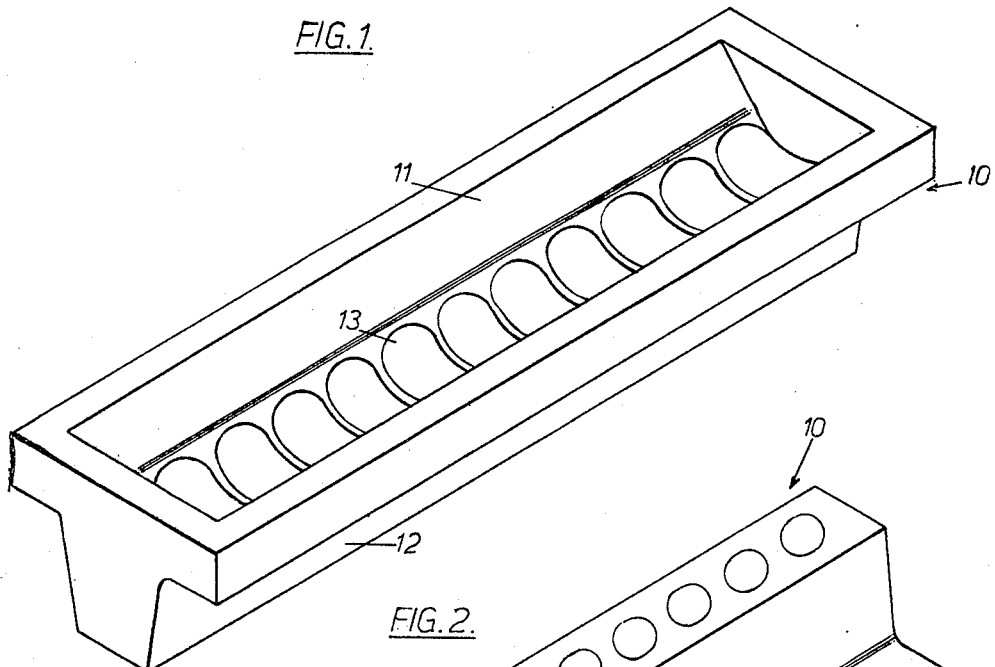
Figure 2:
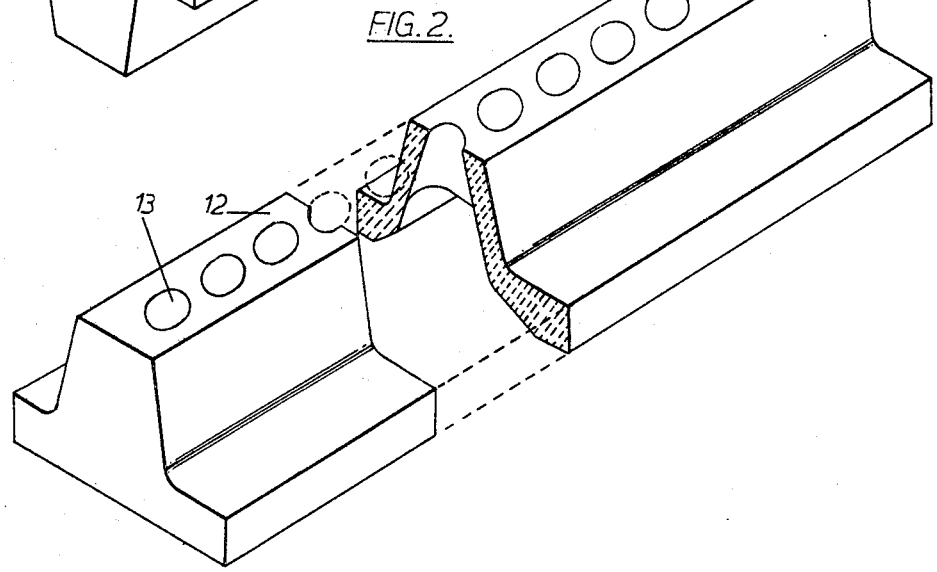
Figure 3:
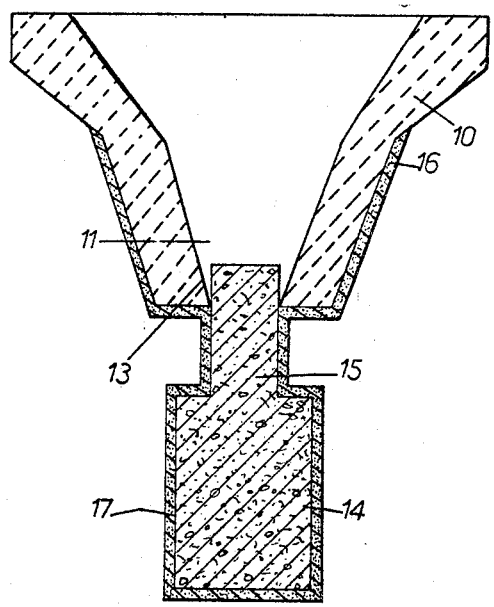

The invention is illustrated, merely by way of example, in the accompanying drawings, in which:

FIGURE 1 is a perspective view of a trough member according to the present invention which is adapted for use in shell moulding, FIGURE 2 is a view partly in section of the trough member of FIGURE 1 in an inverted position, and FIGURE 3 is a diagrammatic sectional view showing shell mould material which has been formed simultaneously about both an expendable pattern and the said trough member.

In FIGURES 1 and 2, there is shown a trough member 10 of a refractory ceramic material such as fire clay, the trough member 10 being adapted for use in the shell moulding of a batch of cast objects.

The trough member 10 is substantially T-shaped in cross section and is provided adjacent its top with a funnel-shaped trough 11 which is adapted to receive molten metal to be cast.

The trough member 10 has a base 12 through which extend a row of eleven similar apertures 13 each of which is funnel-shaped and communicates with the bottom of the trough 11.

In order to produce a batch of cast objects, the necessary number of expendable wax patterns 14 (see FIGURE 3) of the said objects are first made. Each of these expendable patterns 14 is either integrally provided with a wax peg 15 which is adapted to be introduced into an aperture 13 in the trough member 10, or the pattern 14 can be secured or hung onto a separate wax peg 15. Alternatively, the peg 15 could be of a metal such as aluminium and could be coated with expendable material such as tallow.

An assembly is thus formed consisting of the trough member 10, the pegs 15, and the eleven expendable patterns 14.

This assembly is then mounted on a pivoted arm (not shown) of a machine which moves the arm alternately between dipping and dusting stations (not shown). At the dipping station, the said assembly is dipped in a refractory slip of a comminuted refractory material suspended in a refractory binder such as ethyl silicate. The dipping is such that not merely is the whole external surface of the expendable patterns 14 and pegs 15 (or their tallow coatings) wetted, but so also is the adjacent external surface of the trough member 10.

At the dusting station, the wetted assembly is dusted with refractory material which is blown against it.

A series of dipping and dusting steps occurs, the assembly being allowed to dry between each dusting step and the subsequent dipping step. As a result, shell mould material 16 is applied to the assembly in such a way as to form a shell mould about each of the expendable patterns 14 and pegs 15 (or about the tallow coatings of the latter), these shell moulds both being inter-connected to each other and also secured to the common trough member 10.

The assembly so produced is now inverted to the position shown in FIGURE 2 and placed in a furnace (not shown) which may, for example, be gas fired. The wax of the expendable patterns 14 and of the pegs 15 thus melts out so as to leave a set of interconnected empty shell moulds secured to the common trough member 10 by way of riser portions. At the same time the furnace also fires both the trough member 10 and these empty shell moulds. If the pegs 15 are aluminium pegs coated with tallow, the tallow melts and the aluminium pegs drop out.

The structure so produced is now re-inverted and is conveyed to a machine which melts a predetermined quantity of metal to be cast. This metal is introduced in the molten state into the trough 11.

The trough member 10 with the filled shell moulds 17, secured thereto, is then removed from the casting machine to a position where the metal will set, and the trough member 10 and shell moulds 17 are then broken away. This will leave cast objects having rises corresponding to the pegs 15 which will be subsequently removed by machining and/or grinding.

The assembly may be moved from one position to the next, by automatic conveyors (not shown).

Instead of melting out the wax in the furnace, the assembly of shell moulds could be placed in a bath of hot water which would melt out the wax, the said assembly being subsequently fired. Although this involves an additional step in the process, it dispenses with the need to invert and re-invert the assemblies.

I claim:

1. A method of forming cast objects comprising the steps of making expendable patterns of the said objects, said patterns including support members; forming an assembly of a plurality of the expendable patterns and of a common, apertured, trough member, the said assembly being formed by introducing the support member of each expendable pattern into an aperture in the trough member; applying shell mould material to cover each of the expendable patterns of said assembly, and to cover at least the adjacent part of the external surface of the trough member, so as to form a plurality of interconnected shell moulds all of which are secured to the trough member; removing the expendable patterns from the assembly to which the shell mould material has been applied; firing the trough member and shell moulds; pouring molten metal into the trough so as to fill the shell moulds therewith; allowing the metal to set to produce the cast objects; and effecting relative separation of the shell moulds and trough member from the cast objects.

2. A method as claimed in claim 1 in which each support member is of non-expendable material but is coated with expendable material.

3. A method as claimed in claim 1 in which the expendable patterns are removed by inverting the assembly to which the shell mould material has been applied so that the shell moulds are uppermost, and introducing the inverted assembly into a furnace which melts out the expendable material and fires the trough member and empty shell moulds.

4. A method as claimed in claim 1 in which the expendable patterns are removed by placing the assembly in hot water, and subsequently firing the trough member and empty shell moulds.

5. A method as claimed in claim 1 in which the application of shell mould material is accomplished by said assembly being periodically moved between at least one dipping station, where it is covered with a refractory slip, and at least one dusting station where it is then dusted with refractory material.

6. A method as claimed in claim 5 in which the assembly is pivoted alternately between the dipping and dusting stations.

References Cited

UNITED STATES PATENTS

| | | | |
|---|---|---|---|
| 2,759,232 | 8/1956 | Demeter et al. | 164—36 |
| 3,266,106 | 8/1966 | Lirones | 164—35 X |
| 3,348,605 | 10/1967 | Heron | 164—35 |

J. SPENCER OVERHOLSER, Primary Examiner

R. D. BALDWIN, Assistant Examiner

U.S. Cl. X.R.

164—35